US006244731B1

(12) United States Patent
Koiko et al.

(10) Patent No.: US 6,244,731 B1
(45) Date of Patent: Jun. 12, 2001

(54) LAMP COMPRISED OF A COMPOSITE REFLECTOR AND ASPHERIC LENSES

(75) Inventors: Teruo Koiko; Takashi Futami; Yoshifumi Kawaguchi, all of Tokyo (JP)

(73) Assignee: Stanley Electric Co., Ltd. (JP)

( * ) Notice: Subject to any disclaimer, the term of this patent is extended or adjusted under 35 U.S.C. 154(b) by 0 days.

(21) Appl. No.: 09/303,476

(22) Filed: Apr. 30, 1999

(30) Foreign Application Priority Data

May 1, 1998 (JP) ... 10-122211

(51) Int. Cl.[7] ... B60Q 1/02

(52) U.S. Cl. ... 362/297; 362/297; 362/346; 362/518; 362/516; 362/348; 362/309; 362/308; 362/328; 362/268; 362/351; 362/307; 362/343

(58) Field of Search ... 362/297, 346, 362/518, 516, 348, 309, 308, 328, 268, 351, 307, 293, 343

(56) References Cited

U.S. PATENT DOCUMENTS

| | | | | |
|---|---|---|---|---|
| 4,035,631 | * | 7/1977 | Day, Jr. | 362/297 |
| 4,864,476 | * | 9/1989 | Lemons et al. | 362/297 |
| 5,130,902 | * | 7/1992 | Schmid et al. | 362/297 |
| 5,755,503 | * | 5/1998 | Chen et al. | 362/297 |
| 5,909,316 | * | 6/1999 | Watanabe | 359/619 |
| 5,971,568 | * | 10/1999 | Kabuki | 362/297 |
| 6,007,223 | * | 12/1999 | Futami | 362/517 |
| 6,109,772 | * | 8/2000 | Futami et al. | 362/517 |
| 6,152,589 | * | 11/2000 | Kawaguchi et al. | 362/517 |

* cited by examiner

*Primary Examiner*—Sandra O'Shea
*Assistant Examiner*—Anabel M Ton
(74) *Attorney, Agent, or Firm*—Ostrolenk, Faber, Gerb & Soffen, LLP

(57) ABSTRACT

A lamp is composed of a light source, a composite reflector consisting of a plurality of reflecting surface units, and aspheric lenses provided to correspond to the individual reflecting surface units. The composite reflector includes a first and a second reflecting surface units. Each of the first reflecting surface units is formed of a reflecting surface configuration obtained by cutting, radially around a center axis of the light source, a portion from a spheroid having a first focal point located on the center axis and adjacent the light source and a second focal point located on a line passing through the first focal point and tilted appropriately from the center axis such that the cut portion spans a range of 15° to 90° around the center axis. Each of the second reflecting surface units is composed of a second reflecting surface configuration obtained by similarly cutting a portion from a spheroid having a second focal point located external to the first reflecting surface configuration. The first and second reflecting surface configurations are defined in non-overlapping relation with each other to form effective reflecting surfaces. Of the reflecting surface units, the identical ones are combined concentrically to compose the composite reflector. The aspheric lenses are provided to correspond to the respective second focal points of the reflecting surface units of the composite reflector and converge reflected light beams from the respective reflecting surface units.

41 Claims, 6 Drawing Sheets

LAMP COMPRISED OF A COMPOSITE REFLECTOR AND ASPHERIC LENSES

BACKGROUND OF THE INVENTION

1. Field of the Invention

The present invention relates to lamps and, more particularly, to a lamp suitable for use as an illumination lamp for a vehicle such as a head lamp or fog lamp, a signal lamp for a vehicle such as a tail lamp or turn signal lamp, a signal lamp for road traffic, or a signal lamp for railway traffic.

2. Background Art

FIGS. 1 to 3 show conventional lamps of this type. A lamp 90 shown in FIG. 1 basically includes: a light source 91; a revolutional paraboloidal reflector 92; and a lens 93 with a lens cut 93*a*. A light beam from the light source 91 is reflected by the revolutional paraboloidal reflector 92 to form a parallel light beam. The reflected light beam is diffused properly by the lens cut 93*a* of the lens 93 to provide a desired light distribution property.

A lamp 80 shown in FIG. 2 includes: a light source 81; a reflector composed of a composite reflecting surface 82; and a lens 83. The composite reflecting surface 82 has a plurality of cylindrical parabolic reflecting surfaces that are arranged to have a parabolic configuration in a vertical cross section taken when the lamp 80 is in a mounted state and have a linear configuration in a horizontal cross section (the state shown in the drawing). The lens 83 has no lens cut so that it is see-through. In the lamp 80, the composite reflecting surface 82 provides the light distribution property by itself.

A lamp 70 shown in FIG. 3 includes: a light source 71; a reflector composed of an ellipsoidal reflecting surface 72 having the light source 71 disposed at a first focal point; an aspheric lens 73; and a shade 74 provided if necessary. The ellipsoidal reflecting surface is composed of a spheroid, a composite ellipsoidal surface, or an ellipsoidal free-form surface. In the arrangement, the aspheric lens 73 projects, under magnification, a light source image formed by converging a light beam at a second focal point to provide an irradiating light beam. The lamp 70 of the type using the ellipsoidal reflecting surface 72 is termed a projector type lamp. The light distribution property is obtained by covering an unwanted portion with the shade 74.

In the lamp 90 shown in FIG. 1, however, the lens cut 93*a* should be formed to have high optical intensity, so that a significant variation is produced in the thickness of the lens 93. This degrades the transparency of the lens and makes it impossible to provide an appearance with enhanced clarity and sense of depth, which is currently preferred on the market.

It is possible to impart an appearance with enhanced clarity to the lamp 80 shown in FIG. 2, since the lens 83 without a lens cut is see-through. However, since the composite reflecting surface 82 positioned at a recessed portion forms a light distribution property, the formation of the light distribution property is limited by such a factor as difficulty in determining the light distribution property in the direction of width.

The lamp 70 shown in FIG. 3 is difficult to mount because of its increased depth dimension. Moreover, the aspheric lens 73 having a small outer diameter leads to a reduced light-emitting area. Therefore, the lamp 70 used as a head lamp is inferior in visibility when viewed from an oncoming vehicle.

Each of the conventional lamps 70, 80, and 90 with the aforesaid structures is generally in wide use. Hence, it is impossible to distinguish them from other items and achieve novelty in terms of design. Furthermore, since the coefficient of use of a luminous flux from the light source is dependent on the depth dimension, the coefficient of use is lowered if the lamp is reduced in thickness.

SUMMARY OF THE INVENTION

It is therefore an object of the present invention to provide a lamp with an unprecedented and novel design including a plurality of aspheric lenses.

Another object of the present invention is to provide a lamp having a light distribution property free from constraints and exhibiting enhanced flexibility particularly in the horizontal direction.

Still another object of the present invention is to provide a lamp having a desired light-emitting area and improved visibility when viewed from an oncoming vehicle.

Yet another object of the present invention is to provide a lamp wherein the coefficient of use of a luminous flux from the light source is unaffected by the depth dimension.

One aspect of the present invention is to provide a lamp comprising: a light source; a composite reflector including a plurality of first reflecting surface units and a plurality of second reflecting surface units, of which the identical reflecting surface units are combined concentrically to compose the composite reflector, each of the first reflecting surface units being formed of a first reflecting surface configuration obtained by cutting, radially around a center axis of the light source, a portion from a spheroid having a first focal point located on the center axis and adjacent the light source and a second focal point located on a line passing through the first focal point and tilted appropriately from the center axis such that the cut portion spans a range of 15° to 90° around the center axis, each of the second reflecting surface units being composed of a second reflecting surface configuration obtained by cutting, radially around the center axis, a portion from a spheroid having the first focal point and a second focal point located external to the first reflecting surface configuration such that the cut portion spans a range of 15° to 90° around the center axis, the first and second reflecting surface configurations being defined in non-overlapping relation with each other such that a reflected light beam converged at each of the second focal points is effective as an irradiating light beam from the lamp; and aspheric lenses provided to correspond to the respective second focal points of the reflecting surface units of the composite reflector and converge reflected light beams from the respective reflecting surface units.

If necessary, the composite reflector may further include a plurality of third reflecting surface units combined concentrically to compose the composite reflector, each of the third reflecting surface units being formed of a third reflecting surface configuration obtained by cutting, radially around the center axis, a portion from a spheroid having the first focal point and a second focal point located external to the second reflecting surface configuration such that the cut portion spans a range of 15° to 90° around the center axis, the third reflecting surface configuration being defined in non-overlapping relation with the other reflecting surface configurations such that a reflected light beam converged at the second focal point is effective as an irradiating light beam from the lamp. In this case, the lamp may further comprise aspheric lenses provided to correspond to the respective second focal points of the reflecting surface units and converge reflected light beams from the respective reflecting surface units.

Shades for forming a light distribution pattern may be disposed at respective near-focal points of the aspheric lenses.

In the lamp, a central reflector obtained by cutting a portion from a spheroid having a first focal point adjacent the light source for causing the center axis to coincide with a long axis and an aspheric lens located to correspond to a second focal point of the central reflector may also be disposed on the center axis.

In this case, a shade for forming a light distribution pattern may be disposed at a near-focal point of the aspheric lens disposed to correspond to the central reflector.

Another aspect of the present invention is to provide a lamp comprising: a light source; a composite reflector including a plurality of first reflecting surface units and a plurality of second reflecting surface units, of which the identical surface reflecting surface units are combined concentrically to form the composite reflector, each of the first reflecting surface units being formed of a first reflecting surface configuration obtained by cutting, radially around a center axis of the light source, a portion from an elliptic free-form surface having a first focal point located on the center axis and adjacent the light source and a second focal point which is linear in a direction horizontal to the lamp in a mounted state and located on a line passing through the first focal point and tilted from the center axis such that the cut portion spans a range of 15° to 90° around the center axis, each of the second reflecting surface units being composed of a second reflecting surface configuration obtained by cutting, radially around the center axis, a portion from an elliptic free-form surface having the first focal point and a second focal point which is linear in a direction horizontal to the lamp in a mounted state and located external to the first reflecting surface configuration such that the cut portion spans a range of 15° to 90° around the center axis, the first and second reflecting surface configurations being defined in non-overlapping relation with each other such that a reflected light beam converged at each of the second focal points is effective as an irradiating light beam from the lamp; and an aspheric lens provided to correspond to the second local point of each of the reflecting surface units of the composite reflector and converge a reflected light beam from each of the reflecting surface units.

If necessary, the composite reflector may further include a plurality number of third reflecting surface units combined concentrically to form the composite reflector, each of the third reflecting surface unit being formed of a third reflecting surface configuration obtained by cutting, radially around the center axis, a portion from an elliptic free-form surface having the first focal point and a second focal point which is linear in a direction horizontal to the lamp in a mounted state and located external to the second reflecting surface configuration such that the cut portion spans a range of 15° to 90° around the center axis, the third reflecting surface configuration being defined in non-overlapping relation with the other reflecting surface configurations such that a reflected light beam converged at the second focal point is effective as an irradiating light beam from the lamp. In this case, the lamp further comprises an aspheric lens provided to correspond to the second local point of each of the reflecting surface units and converge a reflected light beam from each of the reflecting surface units.

A shade for forming a light distribution pattern may be disposed at a near-focal point of the aspheric lens. Preferably, the shade for forming a light distribution pattern has a configuration corresponding to the position of the second focal point which changes in the horizontal direction such that the both end portions of the shade are curved horizontally symmetrically relative to the near-focal point of the aspheric lens toward the aspheric lens.

A central reflector formed of a portion cut from an elliptic free-form surface for causing the center axis to coincide with a long axis, locating a first focal point adjacent the light source, and forming a second focal point which is linear in a direction horizontal to the lamp in a mounted state and an aspheric lens located to correspond to the second focal point of the central reflector may be disposed on the center axis.

Alternatively, a shade for forming a light distribution pattern may be disposed at a near-focal point of the aspheric lens disposed to correspond to the central reflector. Preferably, the shade for forming a light distribution pattern has a configuration corresponding to the second focal point changing in position in the horizontal direction such that the both end portions of the shade are curved horizontally symmetrically relative to the near-focal point of the aspheric lens toward the aspheric lens.

In the above aspects, all the aspheric lenses may be formed integrally with a lens holder portion and the lens holder portion may be formed transparent or opaque.

Alternatively, each of the aspheric lenses may be formed of any one of a convex lens, a Fresnel lens, and a combination of the convex lens and the Fresnel lens.

Further, each of the aspheric lenses may be partly composed of a cylindrical lens.

Alternatively, at least one of the surface of the shade for forming a light distribution pattern viewed through the aspheric lens and the lens holder portion may be in a color other than the color of the aspheric lens. Further, the light source may be provided with a diffusion filter or color filter in the form of a cap.

In the arrangement, the lamp according to the present invention includes the plurality of aspheric lenses, which provides an unprecedented and novel design whether the lamp is in the ON state and in the OFF state. As a result, the lamp according to the present invention is distinguished from a lamp in a conventional scheme and receives increased attention, so that the marketability thereof is excellently improved.

By providing the lens holder portion and forming all the aspheric lenses integrally therewith, if the lens holder portion is transparent, it becomes possible to mix an image from the lens holder portion through which the inner surface of the lamp is viewed as it is with an image from the aspheric lenses through which the inner surface of the lamp is viewed under magnification, thereby providing an unprecedented and novel appearance.

If the lens holder portion is further formed opaque and the shade is also colored, it becomes possible to implement a lamp presenting different colors in the ON state and in the OFF state, respectively. In addition, if the aspheric lens is formed in a Fresnel configuration, an appearance like crystal glass can be obtained. Thus, the present invention offers wider design variations to a lamp and achieves an excellent effect in improving the marketability of the lamp.

In terms of performance, the lamp has improved mountability owing to a reduced thickness of the whole lamp. This is because the reflecting surface units are formed of elliptic reflecting surfaces that are opened outwardly and hence the composite reflector, which is a combination thereof, has a reduced depth dimension. Moreover, the temperature of each of the aspheric lenses can be reduced by distributing light from the single light source to the plurality of aspheric lenses. As result, it becomes possible to compose the lenses of a resin and achieve an excellent cost reducing effect.

With the provision of the central reflector, the majority of light from the light source can be used as effective irradiating light. This increases the coefficient of use of a luminous flux from the light source. Since the plurality of aspheric lenses have enlarged the light-emitting area, there can be achieved the excellent effect of improved visibility when viewed from the oncoming vehicle.

DETAILED DESCRIPTION OF THE PREFERRED EMBODIMENTS

Figure 4:
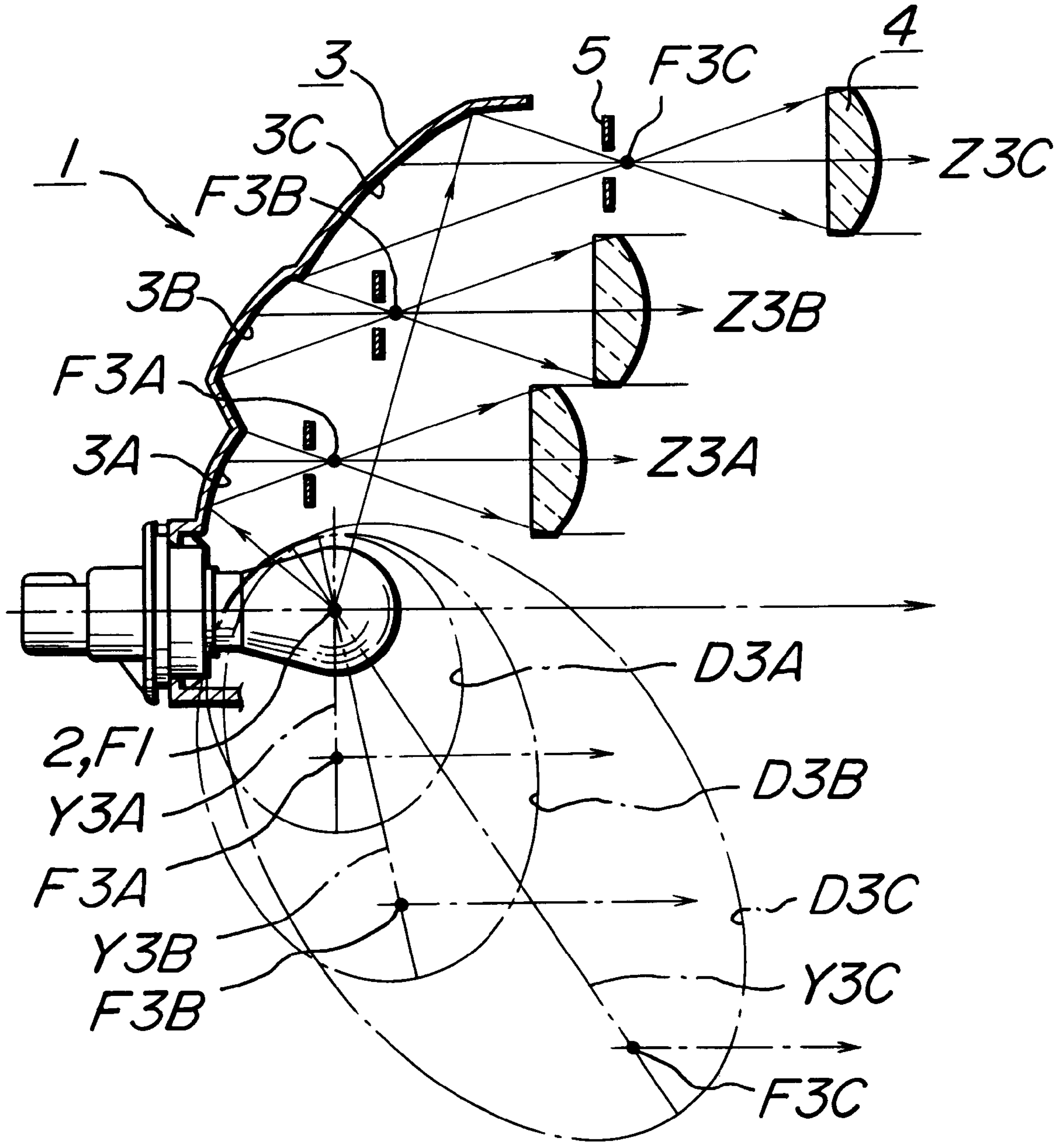
FIG. 4 is a view illustrating a lamp according to a first embodiment of the present invention.
Figure 5:
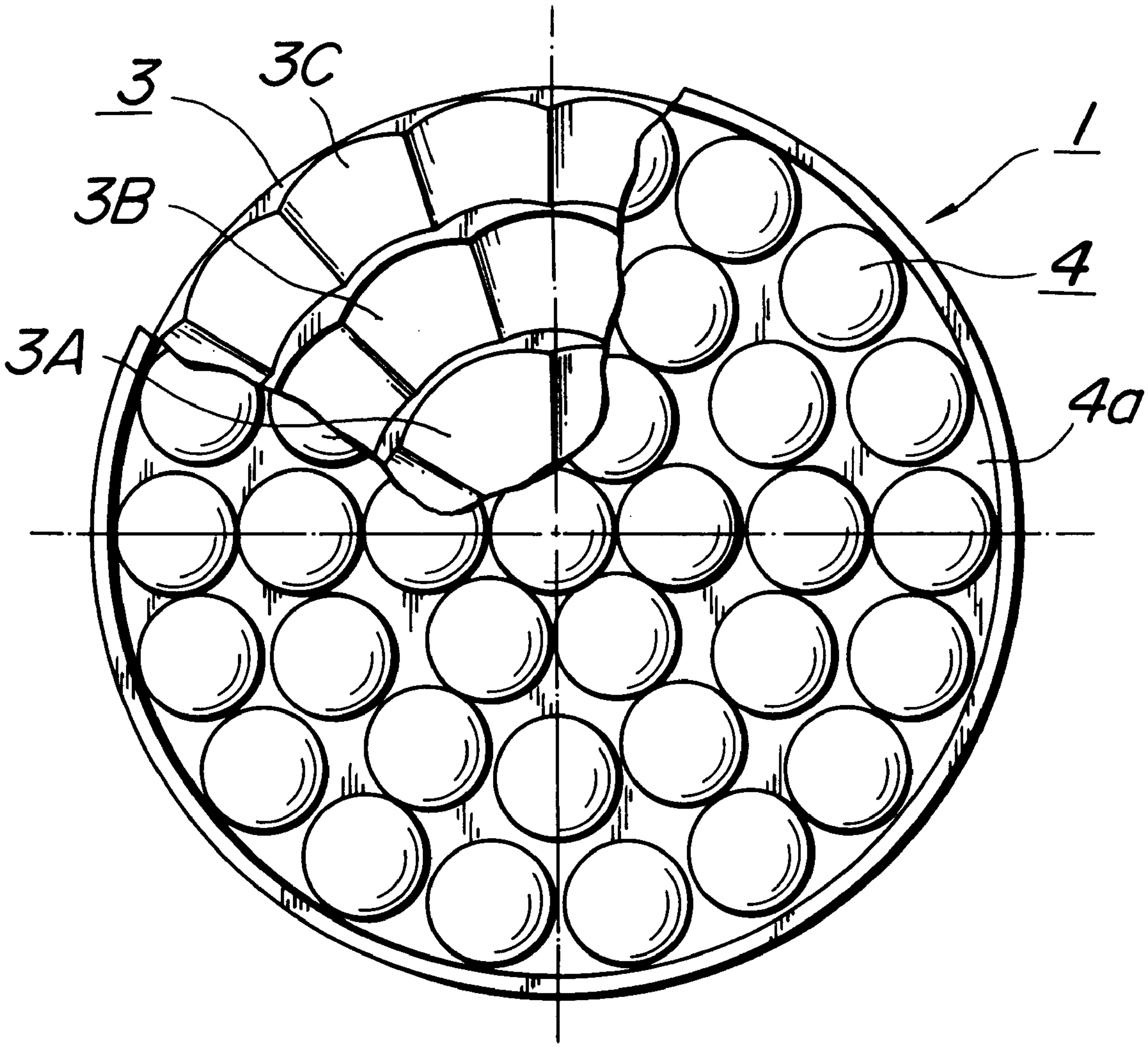
FIG. 5 is a partially cutaway front view of the lamp according to the first embodiment shown in FIG. 1.

The present invention will now be described in detail with reference to the drawings which illustrate the embodiments thereof. FIGS. 4 and 5 show a lamp 1 according to the first embodiment of the present invention. The lamp 1 is basically composed of: a light source 2; a composite reflector 3; and aspheric lenses 4. The composite reflector 3 consists of a plurality of first reflecting surface units 3A, a a plurality of second reflecting surface units 3B, and a plurallity of third reflecting surface units 3C. By way of example, the first embodiment will be described based on the assumption that the third reflecting units 3C are provided therein.

The composite reflector 3 is designed and disposed relative to the center axis of the light source (hereinafter referred to as a valve center axis X) which passes through the light source 2 and coincides with the direction of irradiation from the lamp 1. In forming the composite reflector 3 of the present invention, there are initially defined three reflecting surface configurations which are obtained from three spheroids each having a first focal point F1 located at the light source 2, i.e., first, second, and third reflecting surface configurations D3A, D3B, and D3C.

In forming the first reflecting surface configuration D3A, a long axis Y3A passing through the light source 2 (first focal point F1) and tilted appropriately from the valve center axis X is defined. A second focal point F3A is located appropriately on the long axis Y3A and an appropriate ellipse having its focal points at the first and second focal points F1 and F3A is assumed. The ellipse is rotated around the long axis Y3A to provide a spheroid. The first reflecting surface configuration D3A is obtained by cutting, from the spheroid, a portion having a vertex on the valve center axis X and spanning a range of 15° to 90° around the valve center axis X such that the cut portion is bilaterally symmetrical with respect to the long axis Y3A when viewed from the front side of the lamp 1.

To be more precise, the first reflecting surface configuration D3A is formed on the inner surface side of the spheroid. The resulting reflecting surface is therefore formed in a closed space and does not radiate a light beam to the outside. Hence, as will be described later, that portion of the first reflecting surface configuration D3A which does not provide effective reflected light for the lamp 1, e.g., a portion with a reflecting surface that cannot be viewed from the front side of the lamp 1 has been removed from the first reflecting surface configuration D3A.

Each of the second and third reflecting surface configurations D3B and D3C are formed in the same manner. In this case, the second focal point F3B of the second reflecting surface configuration D3B is located external to the second focal point F3A of the first reflecting surface configuration D3A, i.e., at a distance larger than the distance from the first focal point F1 of the first reflecting surface configuration D3A to the second focal point F3A. The focal point F3C of the third reflecting surface configuration D3C is located external to the second focal point F3B of the second reflecting surface configuration D3B.

The present invention obtains first, second, and third reflecting surface units 3A, 3B, and 3C from the first, second, and third reflecting surface configurations D3A, D3B, and D3C, respectively. A description will be given below to the process of forming the first reflecting surface unit 3A from the first reflecting surface configuration D3A, which typically exemplifies a method of forming a reflecting surface.

First, there is assumed a line segment which passes through the second focal point F3A of the first reflecting surface configuration D3A and extends in parallel with the valve center axis X. The line segment therefore extends in the direction of irradiation from the lamp 1. In accordance with the present invention, the aspheric lens 4 is disposed to have its optical axis Z3A coincident with the line segment and a focal point adjacent the second focal point F3A. Thus, the line segment becomes the optical axis Z3A of the aspheric lens 4.

In the arrangement, if a light beam incident upon the aspheric lens 4 is reversely traced in the direction of the first reflecting surface configuration D3A, an effective range for the aspheric lens 4 within the limits of the first reflecting surface configuration D3A can be determined so that the portion of the first reflecting surface configuration D3A located within the effective range is defined as the first reflecting surface unit 3A.

Likewise, the second reflecting surface unit 3B and the third reflecting surface configuration D3C can be obtained.

However, there are inconvenient cases where the first reflecting surface unit 3A overlaps the second reflecting surface unit 3B or the light beam from the light source 2 does not reach the second reflecting surface unit 3B shaded by the first reflecting surface unit 3A. To prevent the inconvenient cases, the present invention is required to optimize the respective inclinations of the long axes Y3A to Y3C and the locations of the second focal points F3A to F3C in initially defining the reflecting surface configurations D3A to D3C.

Each of the reflecting surface units 3A to 3C thus obtained is provided in an appropriate number determined by dimensional constraints such as the diameter of the aspheric lens 4 and by design requirements. The reflecting surface units 3A to 3C each provided in an appropriate number are connected to each other to form the integral composite reflector 3. Hence, in accordance with the present invention, the composite reflector 3 has such a configuration that an appropriate number of first reflecting surface units 3A are connected concentrically, an appropriately number of second reflecting surface units 3B are connected concentrically outwardly of the first reflecting surface units 3A, and an appropriate number of third reflecting surface units 3C are connected concentrically outwardly of the second reflecting surface units 3B, as shown in FIG. 5.

Figure 1:
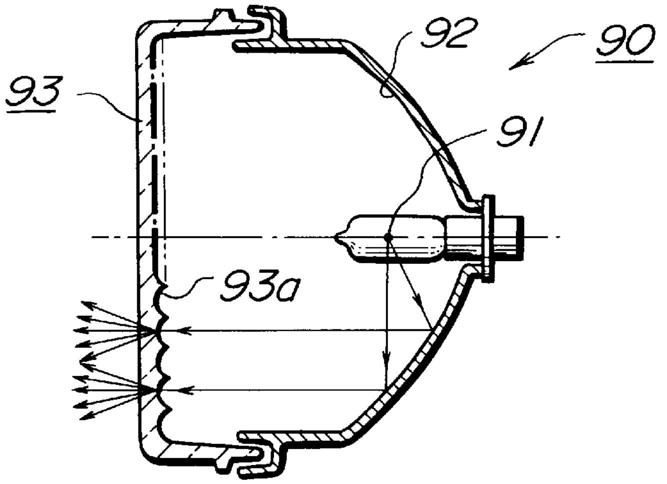
Fig. 1 Prior Art
FIG. 1 is a cross-sectional view showing a conventional embodiment.
Figure 2:
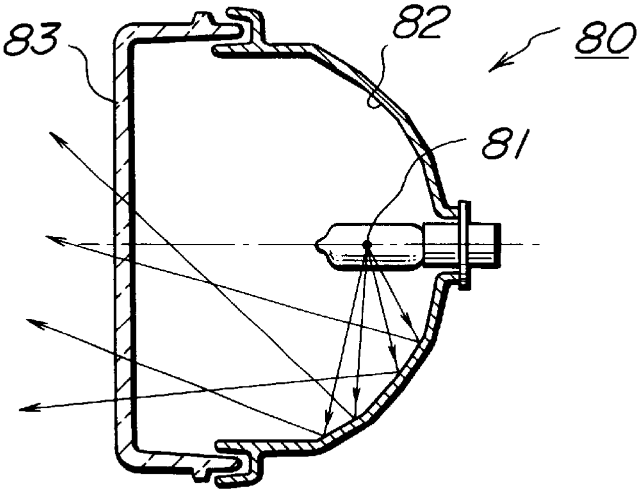
Fig. 2 Prior Art
FIG. 2 is a cross-sectional view showing another conventional embodiment.
Figure 3:
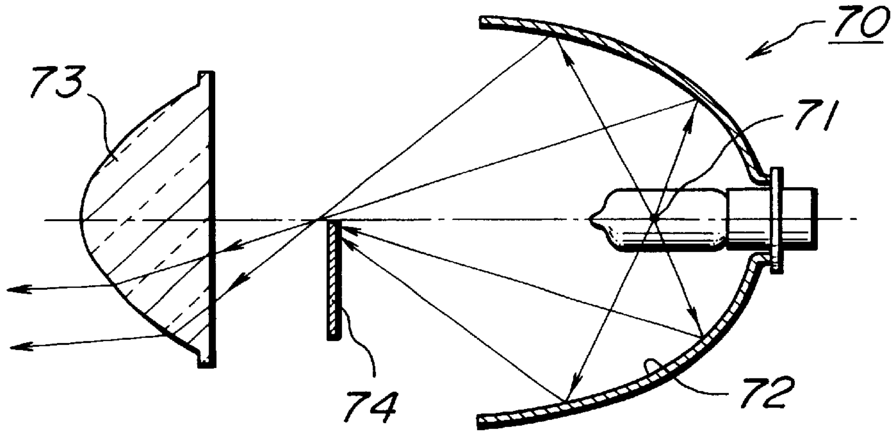
Fig.3 Prior Art
FIG. 3 is a cross-sectional view showing still another conventional embodiment.

In the arrangement, if a description will be given to one of the first reflecting surface units 3A as an example, the light beam from the light source 2 located at the first focal point F1 is converged at the second focal point F3A and the converged light beam is projected in the direction of irradiation by means of the aspheric lens 4. In principle, the irradiating light beam thus obtained is the same as the irradiating light beam obtained in the conventional lamp using the ellipsoidal reflecting surface (see FIG. 3). In the case where the light distribution property is required to have a specific configuration, e.g., where the lamp is used for a head lamp for a vehicle, a shade 5 for forming a light distribution pattern which shields an unwanted portion to cut off the light beam therefrom may be disposed at a near-focal point of the aspheric lens 4.

Figure 6:
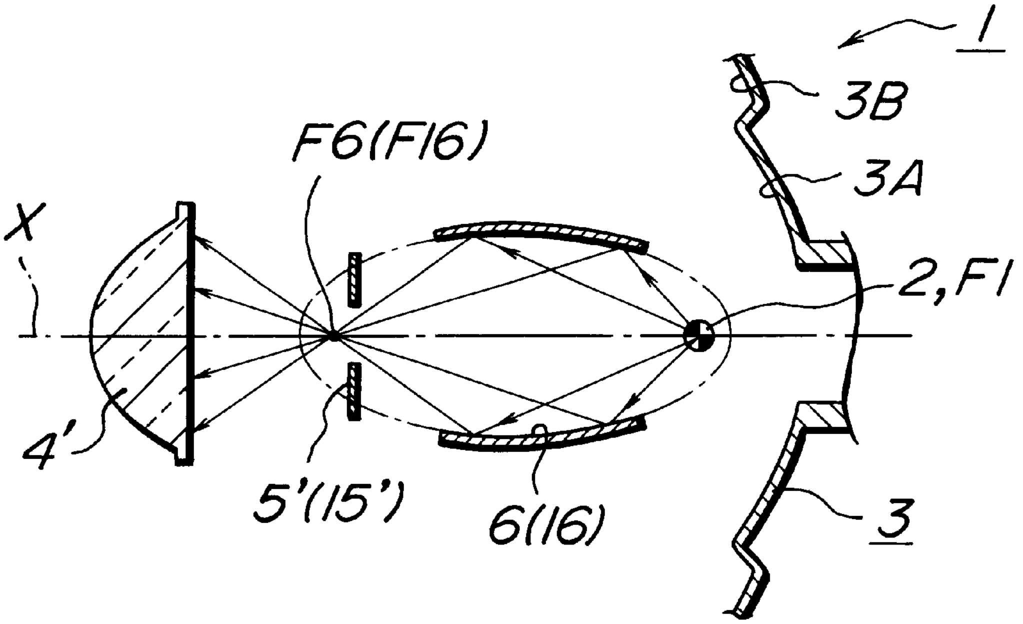
FIG. 6 is a cross-sectional view showing a principal portion of a lamp according to a second embodiment of the present invention.

FIG. 6 shows a principal portion of the second embodiment of the present invention. The second embodiment aims at further increasing the brightness of a lamp 1 by enabling the radiation of light even from on the valve center axis X where the reflecting surface units 3A to 3C are not provided. In short, the second embodiment achieves a further increase in the coefficient of use of a luminous flux from the light source 2.

For this purpose, a central reflector 6 composed of a spheroid having a long axis coincident with the valve center axis X is provided. An aspheric lens 4' having a focal point near the second focal point F6 of an ellipse defined here is provided ahead of the central reflector 6 in the direction of irradiation. If necessary, a shade 5' for forming a light distribution pattern may also be provided.

Figure 7:
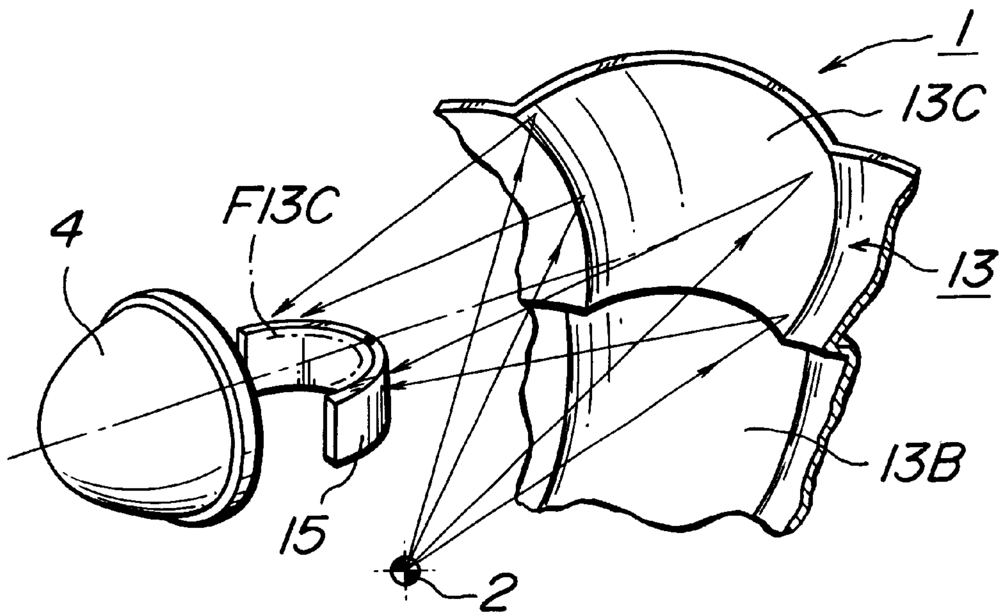
FIG. 7 is a perspective view showing a principal portion of a lamp according to a third embodiment of the present invention.

FIG. 7 shows a principal portion of the third embodiment of the present invention. Although each of the reflecting surface units 3A to 3C is formed from a spheroid in the embodiments described above, it has been found that, if a lamp 1 is used as a head lamp, the irradiation from the reflecting surface formed from a spheroid has an insufficient width in a horizontal direction.

In the third embodiment, each of reflecting surface units 13B and 13C is formed of an elliptic free-form surface (composite elliptic surface) such that second focal points such as linearly expand in a horizontal direction. The drawing shows the reflecting surface unit 13C as an example. Since means for forming the reflecting surface from the elliptical free-form surface has widely been used in the conventional projector type lamp (see FIG. 3), the detailed description thereof is omitted here.

A plurality of reflecting surface units 13B to 13C each formed of an elliptic free-form surface such that the second focal point thereof extends in the horizontal direction are combined to compose a composite reflector 13. In the lamp 1 of the third embodiment thus structured, a basic light distribution property has a generally elliptic configuration with a long axis extending in the horizontal direction, which compensates for the insufficient width of the irradiation in the horizontal direction.

If the lamp 1 according to the third embodiment is used for a low beam, a shade 15 for forming a light distribution pattern may also be disposed between each of the reflecting surface units 13B to 13C and the aspheric lens 4 to correspond to each of the reflecting surface units 13B to 13C. In this case, the shade 15 for forming a light distribution pattern has both end portions curved horizontally symmetrically relative to the near focal point of the aspheric lens 4 toward the aspheric lens 4, thereby corresponding to the second focal point expanding linearly in the horizontal direction, which is produced by each of the reflecting surface units 13B to 13C. Since means for curving the shade 15 for forming a light distribution pattern is also used in the conventional projector type lamp (see FIG. 3), the detailed description thereof is omitted here.

In the third embodiment also, a central reflector 16 (see FIG. 6) for causing the valve center axis X to coincide with the long axis may be provided if an improved coefficient of light use is intended, similarly to the second embodiment. The central reflector may also be formed of an elliptic free-form surface whereby a second focal point, which is linear in the horizontal direction, is located on the valve center axis X, similarly to each of the foregoing reflecting surface units 13B to 13C.

An aspheric lens 49 is disposed to correspond to the second focal point F16 of the central reflector, similarly to the case of the reflecting surface units 13B to 13C. When the central reflector is formed of an elliptic free-form surface, a curved shade 15' for forming a light distribution pattern may also be disposed as necessary, similarly to the case of the reflecting surface units 13A to 13C.

Figure 8:
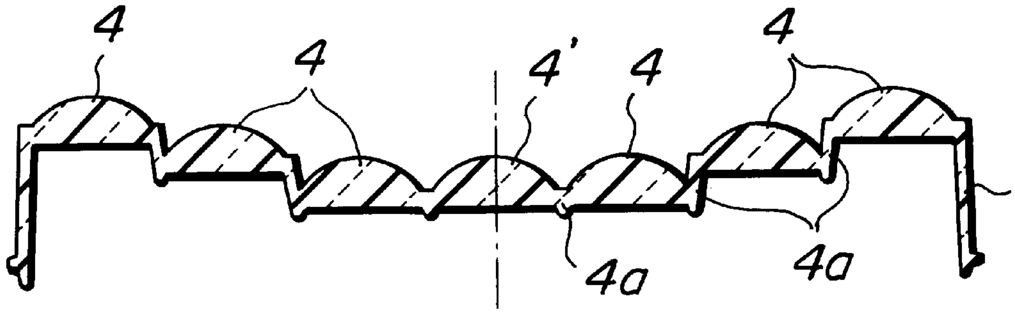
FIG. 8 is a cross-sectional view showing a principal portion of a lamp according to a fourth embodiment of the present invention.

FIG. 8 shows a principal portion of the fourth embodiment of the present invention. In accordance with the present invention, a light beam from the single light source 2 is divided by the reflecting surface units 3A to 3C (or 13B to 13C) to be incident upon the plurality of aspheric lenses 4 and 4'. Accordingly, the quantity of light transmitted by one of the aspheric lenses 4 (hereinafter including the aspheric lenses 4') is reduced significantly so that temperature increase at each of the aspheric lenses 4 during lighting is suppressed.

As a result, the present invention makes it possible to form the aspheric lenses 4 from a resin by injection molding or like process, in contrast to the conventional aspheric lenses 4 that have been formed inevitably from glass to overcome the problem of temperature increase. It is also possible to integrally form all the aspheric lenses 4 used in one lamp with the provision of a holder portion 4*a* for providing a connection between the aspheric lenses 4.

In integrally forming the aspheric lenses 4, the holder portion 4*a* need not necessarily be transparent, while the aspheric lenses 4 are required to be transparent. It is also possible to paint the holder portion 4*a* in an appropriate color in harmony with the surroundings. Alternatively, the holder portion 4*a* may be formed to have a different color which is either transparent or opaque by such a method as two-color injection molding.

If the lamp 1 is used as a head lamp for a vehicle, the color imparted to the frame of the vehicle is imparted not only to the holder portion 4*a* but also to the surface of the shade 5 for forming a light distribution pattern (including 15) facing the aspheric lenses 4. As a result, the color of the shade 5 for forming a light distribution pattern is viewed under magnification through the aspheric lens 4 during lighting, which allows the entire lamp 1 to be viewed, from every direction, in the same color as the car frame.

Figure 9:
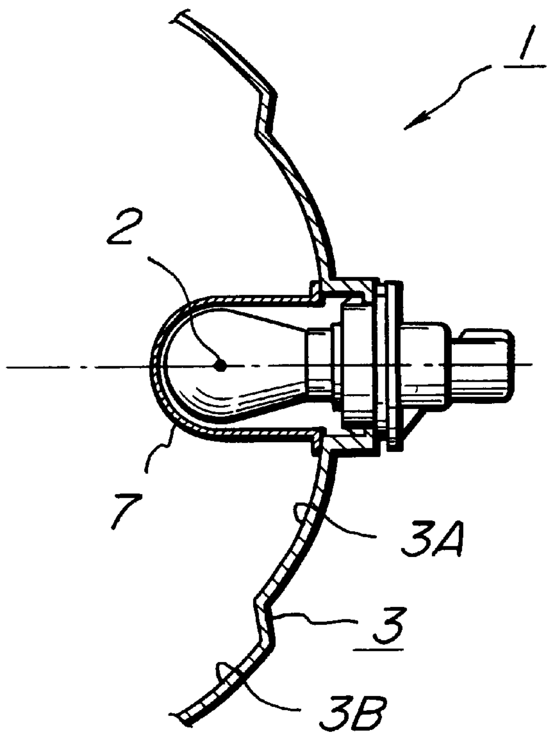
FIG. 9 is a cross-sectional view showing a principal portion of a lamp according to a fifth embodiment of the present invention.

FIG. 9 shows a principal portion of the fifth embodiment. When a lamp 1 is used as a traffic signal light, light from the lamp 1 in the ON state should be colored in red, blue, or yellow. For this purpose, an aspheric lens 4 may also be colored. In the present embodiment, the light from the lamp 1 in the ON state is colored by attaching a color filter 7 in the form of a cap to a light source 2. The filter 7 may also have proper diffusiveness to impart proper diffusiveness to an irradiating light beam.

Figure 10:
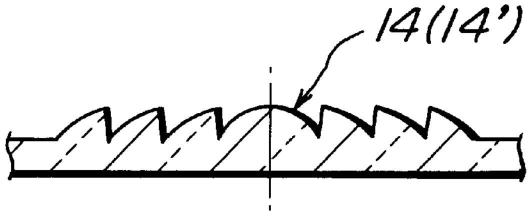
FIG. 10 is a cross-sectional view showing a principal portion of a lamp according to a sixth embodiment of the present invention.
Figure 11:
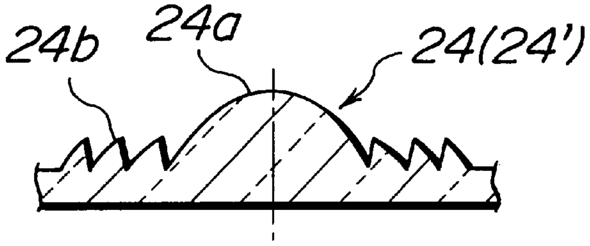
FIG. 11 is a cross-sectional view showing a principal portion of a lamp according to a seventh embodiment of the present invention.

FIGS. 10 and 11 show respective principal portions of sixth and seventh embodiments of the present invention. Although the aspheric lenses 4 and 4' have been formed as convex lenses in either of the first and third embodiments described above, the present invention is not limited thereto. It is also possible to form an aspheric lens in a Fresnel configuration to provide an aspheric Fresnel lens 14 (14'), as shown in FIG. 10 illustrating the sixth embodiment. Alternatively, it is also possible to form a deformed aspheric lens 24 (24'), which is composed of a center portion 24*a* in the form of a convex lens and a peripheral portion 24*b* in the form of a Fresnel lens, as shown in FIG. 11 illustrating the seventh embodiment.

This allows the aspheric lens 4 normally having a configuration projecting conspicuously toward the viewer side to have a less conspicuous forward projection, resulting in a design variation. If the pitch for forming a lens in the Fresnel configuration is controlled properly, an appearance like crystal glass can be imparted to the lens. By forming a lens in the Fresnel configuration, the thickness of the lens becomes uniform. In the case of forming the aspheric lens portion by, e.g., injection molding, therefore, such deformation as sink does not occur during molding, so that optical accuracy is increased.

Figure 12:
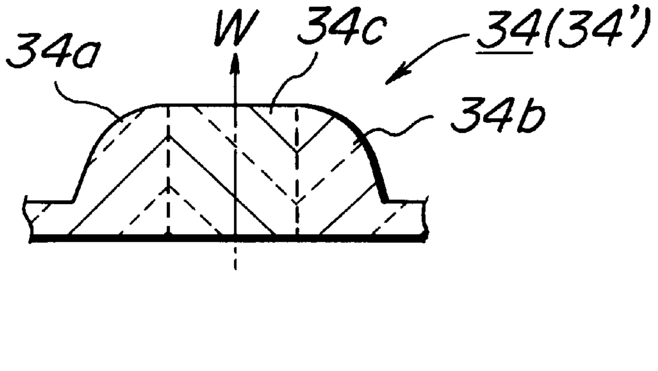
FIG. 12 is a cross-sectional view showing a principal portion of a lamp according to an eighth embodiment of the present invention.

FIG. 12 shows a principal portion of the eighth embodiment of the present invention. An aspheric lens 34 (34') according to the eighth embodiment is composed of lens portions 34*a* and 34*b* and a cylindrical portion 34*c*. The lens portions 34*a* and 34*b* are configured as the halves of the aspheric lens 4 illustrated in the first embodiment, which are obtained by halving the aspheric lens 4 with the center axis. On the other hand, the cylindrical portion 34*c* is configured as a so-called cylindrical lens.

The lens portions 34*a* and 34*b* have their respective divided surfaces connected to the both ends of the cylindrical portion 34*c*. By thus forming the aspheric lens 34, even a luminous flux having a nearly circular cross section from the reflecting surface unit 3*a* formed from the spheroid, as shown in the first embodiment, is enlarged in the direction of the axis W of the cylindrical portion 34*c* on passing through the spherical lens 34. In the case of using the lamp 1 as a headlamp or the like, therefore, the light distribution property which is wide in the horizontal direction can be obtained by disposing the lamp 1 such that the axis W extends in the horizontal direction.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A lamp comprising:

a light source positioned on a central axis of the lamp;

a composite reflector including a plurality of first reflecting units and a plurality of second reflecting units, each of the first reflecting units being a portion of the inner surface of one of a plurality of first ellipsoidal bodies, the first ellipsoidal bodies having:

respective first focal points located on the center axis adjacent to the light source; and respective second focal points located on a line that lies at a first angle relative to the center axis, and disposed in spaced relationship on a plane normal to the center axis and on a circle with its center on the center axis;

each off the first reflecting units being bounded by the intersections of the respective first ellipsoidal bodies with first and second planes extending radially from the center axis and separated from each other by a second angle;

the spacing of second focal points on the circle being such that the first reflecting units do not overlap;

each of the second reflecting units being a portion of the inner surface of one of a plurality of second ellipsoidal bodies, the second ellipsoidal bodies having:

respective first focal points located on the center axis adjacent to the light source; and respective second focal points located on a line that lies at a third angle relative to the center axis, and disposed in spaced relationship on a plane normal to the center axis and on a circle with its center on the center axis;

each of the second reflecting units being bounded by the intersections of the respective second ellipsoidal bodies with first and second planes extending radially from the center axis and separated from each other by a fourth angle;

the spacing of second focal points on the circle being such that the second reflecting units do not overlap;

the distances between the first reflecting units and the respective second focal points being unequal to the distances between the second reflecting units and the respective second focal points; and an aspheric lens respectively associated with each of the first and second reflecting units, the respective second focal point of each of the reflecting units being positioned on the optical axis of the associated aspheric lens to converge a reflected light beam from the respective reflecting unit.

2. The lamp according to claim 1, wherein all the aspheric lenses are formed integrally with a lens holder portion and said lens holder portion is formed transparent or opaque.

3. The lamp according to claim 1, wherein each of said aspheric lenses is formed of any one of a convex lens, a Fresnel lens, and a combination of the convex lens and the Fresnel lens.

4. The lamp according to claim 1, wherein each of said aspheric lenses is partly composed of a cylindrical lens.

5. The lamp according to claim 1, wherein at least one of the surface of said shade for forming a light distribution pattern viewed through said aspheric lens and said lens holder portion is in a color other than the color of the aspheric lens.

6. The lamp according to claim 1, wherein said light source is provided with a diffusion filter or color filter in the form of a cap.

7. A lamp as described in claim 1, in which the composite reflector further includes a plurality of third reflecting units, each of the third reflecting units being a portion of the inner surface of one of a plurality of third ellipsoidal bodies, the third ellipsoidal bodies having:

respective first focal points located on the center axis adjacent to the light source; and respective second focal points located on a line that lies at a fifth angle relative to the center axis, and disposed in spaced relationship on a plane normal to the center axis and on a circle with its center on the center axis;

each of the third reflecting units being bounded by the intersections of the respective third ellipsoidal bodies with first and second planes extending radially from the center axis and separated from each other by a sixth angle;

the spacing of second focal points on the circle being such that the second reflecting units do not overlap;

the distances between the third reflecting units and the respective second focal points being unequal to the distances between the first reflecting units and the respective second focal points and also unequal to the distances between the second reflecting units and the respective second focal points.

8. A lamp as described in claim 7, in which the first, second and third ellipsoidal bodies are prolate spheroids.

9. A lamp as described in claim 8, further including a plurality of shades for forming a light distribution pattern, each of the shades being disposed respectively at a near-focal point of one of the aspheric lens.

10. A lamp as described in claim 8, further including:

a central reflector formed of a portion cut from a further ellipsoidal body having a first focal point adjacent to the light source and having a long axis thereof coincident with the center axis; and a further aspheric lens located at the second focal point of the central reflector.

11. A lamp as described in claim 10, further including a shade for forming a light distribution pattern disposed at a near-focal point of the further aspheric lenses.

12. A lamp as described in claim 7, in which:

the first, second and third ellipsoidal bodies are elliptical free-form bodies; and the second focal points all extend in the horizontal direction when the lamp is mounted in its operative position.

13. A lamp as described in claim 12, further including a plurality of shades which form light distribution patterns, the shades being disposed respectively at near-focal points of each of the aspheric lenses, each of the shades being curved symmetrically along the horizontal extent thereof toward the respective aspheric lens.

14. A lamp as described in claim 12, further including:

a central reflector formed of a portion cut from a further elliptical body, the central reflector having a first focal point adjacent to the light source, a long axis coinciding with the center axis and a second focal point which extends horizontally when the lamp is mounted in its operative position; and a further aspheric lens located at the second focal point of the central reflector.

15. A lamp as described in claim 14, further including a shade which forms a light distribution pattern, the shade being disposed at near-focal point of the further aspheric lenses, the shade being curved symmetrically along the horizontal extent thereof toward the further aspheric lens.

16. A lamp as described in claim 7, in which the second fourth and sixth angles are in the range of about 15 to about 90 degrees.

17. A lamp as described in claim 16, in which the first, second and third ellipsoidal bodies are prolate spheroids.

18. A lamp as described in claim 17, further including a plurality of shades for forming light distribution patterns, each of the shades being disposed respectively at a near-focal point of one of the aspheric lenses.

19. A lamp as described in claim 17, further including:

a central reflector formed of a portion cut from a further ellipsoidal body having a first focal point adjacent to the light source and having a long axis thereof coincident with the center axis; and a further aspheric lens located at the second focal point of the central reflector.

20. A lamp as described in claim 19, further including a shade for forming a light distribution pattern disposed at a near-focal point of the further aspheric lens.

21. A lamp as described in claim 16, in which the first, second and third ellipsoidal bodies are elliptical free-form bodies.

22. A lamp as described in claim 21, further including a plurality of shades which form light distribution patterns, the shades being disposed respectively at near-focal points of each of the aspheric lenses, each of the shades being curved symmetrically along the horizontal extent thereof toward the respective aspheric lens.

23. A lamp as described in claim 21, further including:

a central reflector formed of a portion cut from a further elliptical body, the central reflector having a first focal point adjacent to the light source, a long axis coinciding with the center axis and a second focal point which extends horizontally when the lamp is mounted in its operative position; and a further aspheric lens located at the second focal point of the central reflector.

24. A lamp as described in claim 23, further including a shade which forms a light distribution pattern, the shade being disposed at a near-focal point of the further aspheric lens, the shade being curved symmetrically along the horizontal extent thereof toward the further aspheric lens.

25. A lamp as described in claim 1, in which the first and second ellipsoidal bodies are prolate spheroids.

26. A lamp as described in claim 25, further including a plurality of shades for forming a light distribution pattern, each of the shades being disposed respectively at a near-focal point of one of the aspheric lens.

27. A lamp as described in claim 25, further including:

a central reflector formed of a portion cut from a further ellipsoidal body having a first focal point adjacent to the light source and having a long axis thereof coincident with the center axis; and a further aspheric lens located at the second focal point of the central reflector.

28. A lamp as described in claim 27, further including a shade for forming a light distribution pattern disposed at a near-focal point of the further aspheric lens.

29. A lamp as described in claim 1, in which:

the first and second ellipsoidal bodies are elliptical free-form bodies; and the second focal points all extend in the horizontal direction when the lamp is mounted in its operative position.

30. A lamp as described in claim 29, further including a plurality of shades which form light distribution patterns, the shades being disposed respectively at near-focal points of each of the aspheric lenses, each of the shades being curved symmetrically along the horizontal extent thereof toward the respective aspheric lens.

31. A lamp as described in claim 29, further including:

a central reflector formed of a portion cut from a further elliptical body, the central reflector having a first focal point adjacent to the light source, a long axis coinciding with the center axis and a second focal point which extends horizontally when the lamp is mounted in its operative position; and a further aspheric lens located at the second focal point of the central reflector.

32. A lamp as described in claim 31, further including a shade which forms a light distribution pattern, the shade being disposed at a near-focal point of the further aspheric lens, the shade being curved symmetrically along the horizontal extent thereof toward the further aspheric lens.

33. A lamp as described in claim 1, in which the second and fourth angles are in the range of about 15 to about 90 degrees.

34. A lamp as described in claim 33, in which the first and second ellipsoidal bodies are prolate spheroids.

35. A lamp as described in claim 34, further including a plurality of shades for forming light distribution patterns, each of the shades being disposed respectively at a near-focal point of one of the aspheric lens.

36. A lamp as described in claim 34, further including:

a central reflector formed of a portion cut from a further ellipsoidal body having a first focal point adjacent to the light source and having a long axis thereof coincident with the center axis; and a further aspheric lens located at the second focal point of the central reflector.

37. A lamp as described in claim 36, further including a shade for forming a light distribution pattern disposed at a near-focal point of the further aspheric lens.

38. A lamp as described in claim 33, in which:

the first and second ellipsoidal bodies are elliptical free-form bodies; and the second focal points all extend in the horizontal direction when the lamp is mounted in its operative position.

39. A lamp as described in claim 38, further including a plurality of shades which form light distribution patterns, the shades being disposed respectively at near-focal points of each of the aspheric lenses, each of the shades being curved symmetrically along the horizontal extent thereof toward the respective aspheric lens.

40. A lamp as described in claim 38, further including:

a central reflector formed of a portion cut from a further elliptical body, the central reflector having a first focal point adjacent to the light source, a long axis coinciding with the center axis and a second focal point which extends horizontally when the lamp is mounted in its operative position; and a further aspheric lens located at the second focal point of the central reflector.

41. A lamp as described in claim 40, further including a shade which forms a light distribution pattern, the shade being disposed at a near-focal point of the further aspheric lens, the shade being curved symmetrically along the horizontal extent thereof toward the further aspheric lens.

* * * * *